United States Patent [19]

Sample, Jr.

[11] 3,909,422

[45] Sept. 30, 1975

[54] METHOD FOR REMOVING ELEMENTAL SULFUR IN SOUR GAS WELLS

[75] Inventor: Thomas E. Sample, Jr., Houston, Tex.

[73] Assignee: Texaco Inc., New York, N.Y.

[22] Filed: Dec. 18, 1972

[21] Appl. No.: 315,950

[52] U.S. Cl................ 252/8.55 B; 166/312; 299/5; 423/511; 423/512
[51] Int. Cl........................ E21b 43/00; E21b 37/00
[58] Field of Search........ 166/311, 312, 307; 299/5; 252/8.55 B; 423/512, 514, 511, 519, 561, 562

[56] References Cited
UNITED STATES PATENTS

| 1,934,626 | 11/1933 | Nagelvoort | 423/562 |
|---|---|---|---|
| 2,198,435 | 4/1940 | Hart | 252/8.55 |
| 2,640,810 | 6/1953 | Cardwell et al. | 166/307 X |
| 2,763,531 | 9/1956 | Levenson | 423/514 |
| 2,771,284 | 11/1956 | Monroe | 299/5 |
| 3,488,092 | 1/1970 | Dean et al. | 299/5 |
| 3,531,160 | 9/1970 | Fisher | 299/5 |
| 3,660,287 | 5/1972 | Quattrini | 252/8.55 |
| 3,696,040 | 10/1972 | Mayo | 252/87 |

OTHER PUBLICATIONS

Hackh's Chemical Dictionary, Pub. 1969, Fourth Edition, page 26.

*Primary Examiner*—Herbert B. Guynn
*Attorney, Agent, or Firm*—Thomas H. Whaley; C. G. Ries; Kenneth R. Priem

[57] ABSTRACT

A process for producing sour gas wells whereby attendant problems due to sulfur deposition within the producing formation, well and surface equipment are prevented or alleviated by contacting the formation, well and surface equipment with a chemical composition whose aqueous solution will solubilize the sulfur by primary chemical reaction and containing a wetting agent to facilitate and accelerate the sulfur dissolution and removal.

6 Claims, 1 Drawing Figure

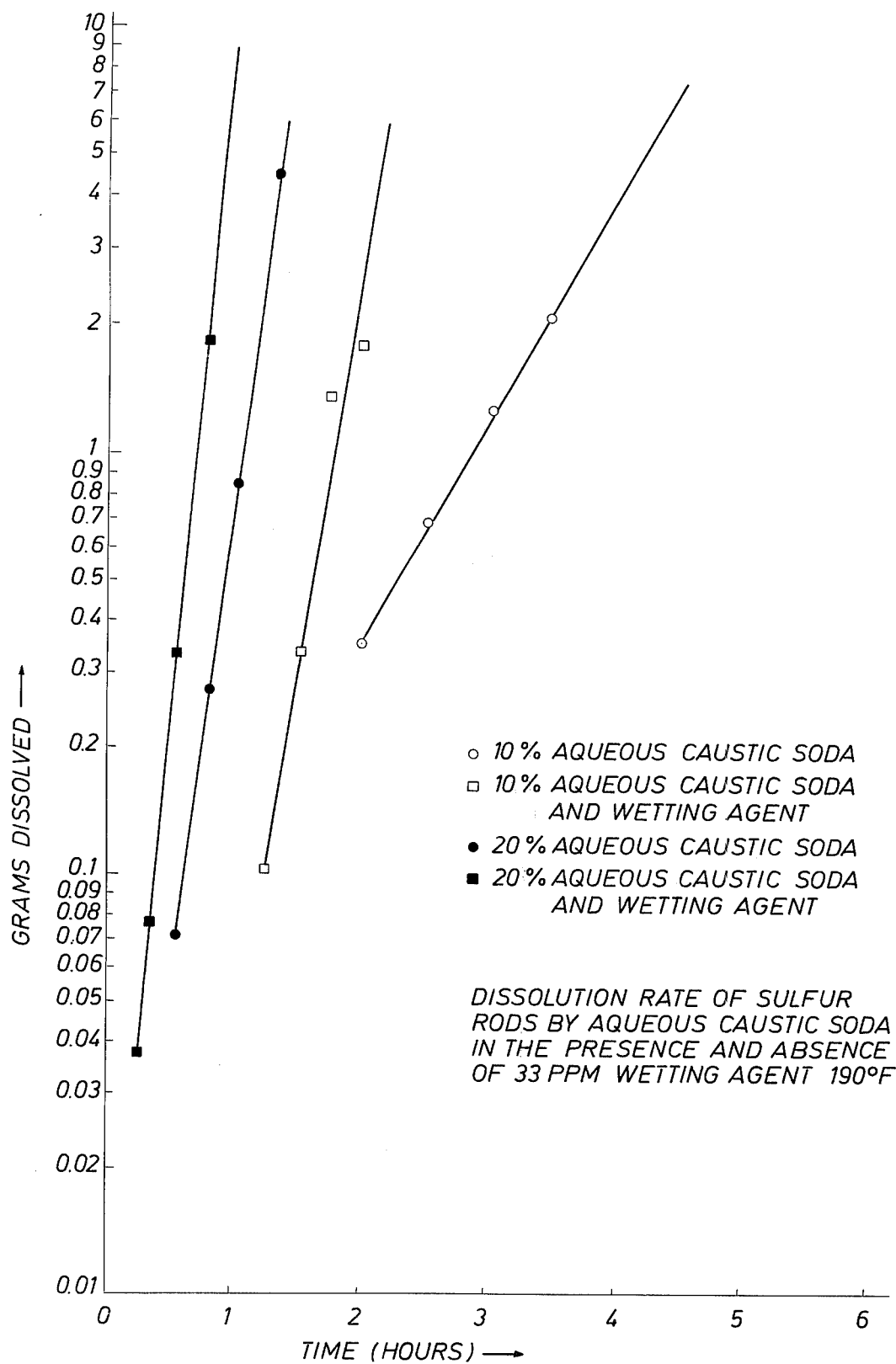

METHOD FOR REMOVING ELEMENTAL SULFUR IN SOUR GAS WELLS

BACKGROUND OF THE INVENTION

1. Field of the Invention

This invention relates to the treatment of sour gas producing wells to prevent or alleviate solid sulfur deposition therein.

2. Discussion of the Prior Art

The drilling, completion and production of many natural gas wells is complicated by the presence of hydrogen sulfide in the subterranean formation in which the natural gas originates. Natural gas containing appreciable amounts of hydrogen sulfide is called "sour gas," or "acid gas."

Because of the toxicity of hydrogen sulfide the production of sour gas must be accompanied by intensive safety practices. Also, corrosion failures due to sulfide stress cracking of high-strength steels are well known.

Elemental sulfur and/or hydrogen polysulfides (sulfanes) are commonly present in formation fluids containing a high concentration of hydrogen sulfide. One of the most pressing problems attendant to the production of sour gas wells is due to the deposition of elemental sulfur from these fluids on wellbores, tubing, other production equipment and inside the formation itself. It has been determined that the apparent "solubility" of elemental sulfur increases in the gas phase with increasing hydrogen sulfide content, rising temperature and increasing pressure. When being produced the hot, pressurized gas containing hydrogen sulfide, sulfur and/or sulfanes rises past the cooler strata and expands causing sulfur to separate from the gas. The chemical "dissolution" of sulfur in hydrogen sulfide, which in effect represents sulfane formation, may be depicted as the following reversible process:

$$H_2S + S_x^\circ \rightleftharpoons H_2S_{(x+1)} \qquad (1)$$

Also, it is possible that the oxidation of sulfide to elemental sulfur may occur. In any case, the deposition of elemental sulfur will cause productivity to decline unless remedial action is taken. Prior to my invention several methods were suggested or have been used in the effort to remove elemental sulfur from sour gas wells and related equipment or to prevent the deposition of elemental sulfur during production. Briefly, these methods are: insulation of the wellbore to keep temperature gradients from occurring; use of solvents to physically dissolve elemental sulfur; and the addition of solutions of certain chemicals which react with elemental sulfur yielding sulfur derivatives which remain in solution.

Insulation of wellbores to prevent temperature variation would be extremely expensive and is generally considered to be an impractical solution to the problem of sulfur deposition in sour gas wells. Physical solvents such as benzene, carbon disulfide, toluene, thiobenzene, diphenyl and halogenated hydrocarbons dissolve elemental sulfur and carry it out of the well as dissolved (not reacted) sulfur, after which the sulfur and solvent may be separated by conventional means. Reactive chemical solvents, such as aqueous solutions of caustic alkalies and/or bases, combine chemically with elemental sulfur to form soluble compounds of sulfur. These include solutions of alkali metal sulfites, alkali metal bisulfites, solutions of alkalies such as caustic soda and other basic materials. The chemical and physical solvent processes are disclosed for example in U.S. Pat. No. 3,488,092 and U.S. Pat. No. 3,531,160.

It is an object of the present invention to provide a novel method whereby chemical solvent processes for sulfur removal in sour gas wells may be improved by the addition of a material generally referred to as a "wetting agent" or "surfactant". By the addition of the wetting agent the chemical solvent may be made vastly more efficient in extent and rate of sulfur dissolution.

SUMMARY OF THE INVENTION

The invention is a process for preventing or removing solid, sulfur deposits in an acid-gas well and in the surrounding production formation by contacting the gas well, the production formation, and the attendant equipment with an aqueous solution capable of chemically reacting with sulfur to form a water-soluble sulfur derivative and containing an effective amount of a wetting agent.

DESCRIPTION OF THE PREFERRED EMBODIMENTS

Elemental sulfur is non-polar and very resistant to wetting by aqueous solutions of alkalies, bases (both inorganic and organic), ammonia, sulfites, bisulfites and the like. In addition, elemental sulfur found in gas wells is likely to be oil wet and, therefore, even less easily wetted by the above aqueous media. For these reasons, aqueous solutions such as those mentioned above, are retarded in their rate of reaction with, and hence removal of, elemental sulfur in a sour gas well and in the surrounding formation. The process of my invention greatly increases the rate of reaction between sulfur and the aqueous solutions by facilitating the wetting of the sulfur by the aqueous solutions. Therefore, the process of my invention aids in quickly dissolving deposited sulfur and in preventing the deposition of sulfur from sour gas wells.

The wetting agent or surfactant for use in my invention may be any of a wide variety of surface active substances. Wetting agent, or surfactant, as used in this disclosure, means any compound or material which reduces surface tension, or decreases the contact angle against sulfur, when dissolved in water or aqueous solutions. For example, soaps, sodium or ammonium salts of alkyl or alkyl-aryl sulfates and sulfonates are typical but not all inclusive of the materials useful in my invention. It is especially preferred to use non-ionic surfactants, such as ethoxylated substituted phenols. Ethylene oxide adducts of nonyl phenol are a typical example.

The aqueous solutions particularly useful in my invention which are capable of chemically reacting with sulfur to form water soluble sulfur derivatives include, for example, aqueous solutions of alkalies, bases (both inorganic and organic), ammonia, sulfites, bisulfites and the like. Broadly any chemical composition whose aqueous solution will solubilize sulfur by primary chemical reaction will also be benefited in the reaction by the addition of a wetting agent as described herein. The broad confines of my invention, therefore, includes the process of preventing or removing solid, sulfur deposits in an acid-gas well and in the surrounding production formation, and the attendant equipment with an aqueous solution capable of chemically reacting with sulfur to form a water soluble sulfur derivative and containing an effective amount of a wetting agent.

A study was conducted by the inventor to investigate the extent to which elemental sulfur may be solubilized by aqueous solutions of bases, the rate at which such dissolution takes place, and the influence of a water-wetting surfactant on this rate. The investigation was performed under laboratory conditions which closely approximate those optimally expected in the wellbores of and in the surface handling equipment of sour gas wells.

EXPERIMENTAL

I. Measurement of Equilibrium Solubility of Elemental Sulfur by Aqueous Caustic Soda (NaOH) and Soda Ash ($Na_2CO_3$)

In each experimental run, 300 grams of an aqueous solution of the appropriate base of the concentration under examination was placed in a 500-ml stainless-steel "mud" bomb having a maximum rated working pressure of 1,000 psig. Powdered crude sulfur was weighed into the bomb and stirred briefly to form a dispersion. The bomb was then sealed, placed horizontally in a thermostated hot air oven, and rotated continuously during predetermind heating periods of 1, 1.5, or 2.5 hours. Duplicate series of runs were made with each of the two bases (at each concentration, amount of elemental sulfur, and heating period) at 231°F. and at 225°F. (corresponding to temperatures slightly below and slightly above the melting range of elemental sulfur, which falls between 235°F. and 238°F.). Concentrations of 10 and 20 percent aqueous caustic soda and 13.3 percent aqueous soda ash were utilized.

In five selected runs (employing caustic soda as the base) the bomb was pressured up, after charging with the alkaline solution and sulfur, and before placing in the oven, to 18–22 psig with $H_2S$, and in three similar runs the bomb was pressured up to 150 psig with carbon dioxide. These latter eight runs were performed to obtain some indication of the influence of the expected acid-gas components of the well production on the sulfur-solubilizing ability of the caustic soda solutions. To gain further insight into the same influence, five runs were made in which the basic solution was aqueous sodium sulfide ($Na_2S$, the reaction product of caustic soda with about 40 percent of its weight of $H_2S$), and four runs employing aqueous sodium hydrosulfide (NaSH, the reaction product of caustic soda with a large excess of $H_2S$).

Finally, in each run, after the heating period was completed the bomb was removed from the oven, permitted to cool about one hour, and its contents transferred to a beaker. If any free sulfur was present after cooling, if was filtered off and weighed, and the amount of sulfur solubilized calculated by difference.

II. Recovery of Elemental Sulfur From the Spent Alkali Liquor

To estimate the possibility of free sulfur recovery from the spent sulfur-solubilizing liquors, aliquots from batches of the spent liquors, representing each of the types of experiments heretofore described, where acidified as follows:
  1. The pH was lowered to about 8.0 by saturation with carbon dioxide (due to buffering action, this was the lowest pH attainable with $CO_2$).
  2. The pH was lowered to 6.5–7.0 using technical muriatic acid.

In each experiment, the sulfur recovered by reprecipitation was filtered, dried and weighed.

III. Measurement of Dissolution Rate of Elemental Sulfur by Aqueous Caustic Soda in the Presence and Absence of Wetting Agent In each experimental run, the elemental sulfur was melted and cast into cylindrical rods, each having the same diameter and approximately the same length. A subsequent 48-hour cure period allowed transformation of the sulfur from the monoclinic to the desired orthorhombic form. Preliminary laboratory experiments taught that caustic soda attack was predominant at areas or irregularity. To evenly distribute the caustic attack, the entire surface of each sulfur rod was roughened by wet sanding with 600-grit sandpaper, after cutting and grinding of the rods to equal lengths (82 mm). Epoxy cement was used to fasten the rods to stainless-steel cylindrical pegs designed to fit around a circular holder which held six rods. The rods were substituted for the elemental powdered sulfur used in the previous set of experiments to allow the caustic soda to attack a constant surface area, since the rate of dissolution is dependent upon such area.

The reaction vessel consisted of a four liter stainless-steel beaker with a fitted cover. The 10 or 20 percent aqueous caustic soda (with and without the wetting agent, a 9.5 molar ethylene oxide adduct of nonyl phenol used throughout the following data and referred to hereinafter as wetting agent) was stirred using a magentic stirring bar and an air-driven magnetic stirrer. The entire reaction was carried out in the hot-air oven.

The six rods mounted on the holder were first submergd in water and heated slowly to the desired reaction temperature. This precaution was required because preliminary experiments revealed that submerging of cool sulfur rods into the hot caustic soda solution, or rapid cooling of hot sulfur rods, caused fracturing of the rods due to thermal shock. The holder and rods were then placed in the preheated reaction vessel. At specified time intervals, a rod was removed from the reaction medium, rinsed with hot water, and finally with hot 2 percent sulfuric acid solution to neutralize the caustic soda. The rod was then placed back into the hot water and allowed to cool slowly to room temperature. After cooling, the rod was dried for 48 hours under a heat lamp, weighed, and the amount of sulfur dissolved calculated by weight loss.

Results the averaged equilibrium solubilities of elemental sulfur as functions of temperature and percent caustic soda are shown in Table I. The data reveal that equilibrium is essentially reached after 1.5 hours. In like manner, the solubilizing capacity of soda ash is shown in Table II. In Tables III–VI, the influences of $H_2S$, $Na_2S$, NaSH and $CO_2$, respectively, upon sulfur solubility in caustic soda are tabulated.

Table VII summarizes the solubility of sulfur in 10 and 20 percent (w/w) aqueous caustic soda at 190°F. and different reaction times, depicting the greatly increased rate of dissolution attributable to the presence of the wetting agent. The same data are plotted in the drawing on semi-log paper to emphasize the first order kinetic nature of the dissolution reaction. The derived slopes and rate constants are tabulated in Table VIII.

Discussion

I. Equilibrium Solubility Measurements

These experiments were designed so that the effects of $H_2S$ and $CO_2$ upon the equilibrium solubility could be determined, in addition to solubilities in their absence.

A. Aqueous Caustic Soda

The data of Table I reveal that the solubility of elemental sulfur in caustic soda according to the reaction.

$$3S° + 6OH^- \rightleftharpoons SO_3^{2-} + 2S^{2-} + 3H_2O \qquad (2)$$

depends directly upon the concentration of caustic soda and is practically constant within the temperature range slightly below or slightly above the melting range of sulfur. Aqueous caustic soda can dissolve about 150 percent of its weight of elemental sulfur within the concentration and temperature range studied.

TABLE I

SOLUBILITY OF SULFUR IN AQUEOUS CAUSTIC SODA

| Caustic Soda Concentration (% w/w) | Temp. (°F.) | Duration Of Expt. (hrs.) | Wt. S° Dissolved (g) | Solubility Of Sulfur (g/g soln.) | $\dfrac{Wt.\ S°}{Wt.\ NaOH} \times 100$ (%) |
|---|---|---|---|---|---|
| 10 | 231 | 1.5 | 40.6 | 0.135 | 135 |
| 10 | 255 | 1.5 | 42.8 | 0.143 | 143 |
| 10 | 255 | 2.5 | 44.9 | 0.149 | 150 |
| 20 | 231 | 1.5 | 88.7 | 0.295 | 148 |
| 20 | 255 | 1.5 | 86.0 | 0.287 | 143 |

B. Aqueous Soda Ash

At a concentration of 13.27 percent (w/w), soda ash, which is equivalent to 10 percent aqueous caustic soda in potential basicity, solubilizes about 15 percent of its weight at 231°F., and about 30 percent at 225°F. These data are tabulated in Table II.

TABLE II

SOLUBILITY OF SULFUR IN AQUEOUS SODA ASH

| Soda Ash Concentration (% w/w) | Temp. (°F.) | Duration Of Expt. (hrs.) | Wt. S° Dissolved (g) | Solubility Of Sulfur (g/g soln.) | $\dfrac{Wt.\ S°}{Wt.\ Na_2CO_3} \times 100$ (%) |
|---|---|---|---|---|---|
| 13.27 | 231 | 1.0 | 5.08 | 0.0170 | 12.8 |
| 13.27 | 231 | 1.5 | 6.35 | 0.0212 | 16.0 |
| 13.27 | 255 | 1.5 | 13.18 | 0.0438 | 33.1 |

C. Aqueous Caustic Soda in the Presence of $H_2S$

Tables III, IV, and V depict the reduction in solubilizing capacity of sulfur by aqueous caustic soda in the presence of $H_2S$. As the concentration of $H_2S$ increases, a limiting value of about 45 percent of the weight of sulfur relative to caustic soda is reached.

TABLE III

SOLUBILITY OF SULFUR IN AQUEOUS CAUSTIC SODA IN THE PRESENCE OF 18–22 PSIG $H_2S$

| Caustic Soda Concentration (% w/w) | $H_2S$ (g) | Temp. (°F.) | Duration Of Expt. (hrs.) | Wt. S° Dissolved (g) | Solubility Of Sulfur (g/g soln.) | $\dfrac{Wt.\ S°}{Wt.\ NaOH} \times 100$ (%) |
|---|---|---|---|---|---|---|
| 10 | 24 | 231 | 1.5 | 12.6 | 0.042 | 42.2 |
| 10 | 18 | 255 | 1.5 | 36.0 | 0.120 | 120.0 |
| 20 | 33 | 231 | 1.5 | 71.5 | 0.238 | 119.0 |
| 20 | 28 | 260 | 1.5 | 72.2 | 0.241 | 120.0 |
| 20 | 33 | 255 | 1.5 | 63.6 | 0.212 | 106.0 |

TABLE IV

SOLUBILITY OF SULFUR IN AQUEOUS CAUSTIC SODA IN PRESENCE OF $Na_2S$
[$NaOH + H_2S$ (40% of NaOH Weight)]

| Equivalent Caustic Soda Concentration (% w/w) | Temp. (°F.) | Duration Of Expt. (hrs.) | Wt. S° Dissolved (g) | Solubility Of Sulfur (g/g soln.) | $\dfrac{Wt.\ S°}{Wt.\ NaOH} \times 100$ (%) |
|---|---|---|---|---|---|
| 60 | 231 | 1.0 | 24 (all)* | 0.080 | 13.4 |
| 60 | 231 | 1.5 | 48 (all)* | 0.160 | 26.7 |
| 60 | 231 | 1.5 | 60 (all)* | 0.200 | 33.4 |
| 60 | 231 | 1.5 | 72 (all)* | 0.240 | 40.0 |
| 60 | 255 | 1.5 | 86.1 | 0.287 | 47.8 |

*The presence of an excess of caustic soda permitted all sulfur to dissolve.

TABLE V

SOLUBILITY OF SULFUR IN AQUEOUS
CAUSTIC SODA IN PRESENCE OF NaSH
[NaOH + Large Excess of $H_2S$]

| Equivalent Caustic Soda Concentration (% w/w) | Temp. (°F.) | Duration Of Expt. (hrs.) | Wt. S° Dissolved (g) | Solubility Of Sulfur (g/g soln.) | $\frac{Wt. S°}{Wt. NaOH} \times 100$ (%) |
|---|---|---|---|---|---|
| 23* | 231 | 1.5 | 28.3 | 0.0942 | 41.0 |
| 23 | 231 | 1.5 | 28.3 | 0.0942 | 41.0 |
| 23 | 255 | 1.5 | 33.8 | 0.1130 | 49.0 |
| 46 | 255 | 1.5 | 54.6 | 0.1820 | 39.7 |

*0.75 mole NaSH

D. Aqueous Caustic Soda in the Presence of Carbon Dioxide

Ten percent aqueous caustic soda, when heated under the same conditions cited in Table I, but under 150 psig carbon dioxide pressure solubilizes at least 120 percent of its weight of elemental sulfur. The effect of excess carbon dioxide upon sulfur solubility in aqueous caustic soda under these conditions appears, therefore, to be negligible as Table VI shows.

TABLE VI

SOLUBILITY OF SULFUR IN
AQUEOUS CAUSTIC SODA IN PRESENCE
OF 150 PSIG $CO_2$

| Caustic Soda Concentration (% w/w) | Temp. (°F.) | Duration Of Expt. (hrs.) | Wt. S° Dissolved (g) | Solubility Of Sulfur (g/g soln.) | $\frac{Wt. S°}{Wt. NaOH} \times 100$ (%) |
|---|---|---|---|---|---|
| 10 | 231 | 1.0 | 12 (all)* | 0.40 | 40 |
| 10 | 231 | 1.0 | 24 (all)* | 0.080 | 80 |
| 10 | 231 | 1.0 | 36 (all)* | 0.120 | 120 |

*The presence of an excess of caustic soda permitted all sulfur to dissolve.

II. Measurement of Tendency of Dissolved Sulfur to Reprecipitate

One serious drawback in the use of physical solvents such as aromatic hydrocarbons is that dissolution is strongly temperature-dependent. By contrast, when the temperature of the spent liquors from the caustic soda or soda ash reaction with sulfur is lowered to 72°F. no precipitation occurs, i.e., the products of the chemical dissolution of the sulfur remain dissolved in the presence or absence of $H_2S$ and/or $CO_2$.

III. Recovery of Sulfur from Spent Liquor

In experiments in which sulfur was recovered from the spent liquor by acidification, 51–52 percent of the dissolved sulfur was recovered by solution saturation with $CO_2$, and 56–61 percent by lowering the pH to 6.5–7.0 with HCl. Further depression of the pH to 1.5 gave a maximum recovery of 65 percent of the theoretical sulfur content, the remainder of the sulfur staying in solution probably in the form of oxygencontaining sulfur compounds.

IV. Dissolution of Sulfur in Caustic Soda With and Without Wetting Agents

Table VII clearly shows the greatly increased rate of dissolution attributable to the presence of a wetting agent.

TABLE VII

RATE OF DISSOLUTION OF SULFUR BY
CAUSTIC SODA + WETTING AGENT AT 190°F.

| Caustic Soda Concentration (% w/w) | Wetting Agent Concentration (ppm) | Time (hrs.) | Average Weight Sulfur Dissolved (g) |
|---|---|---|---|
| 10 | — | 2.0 | 0.35 |
| 10 | — | 2.5 | 0.70 |
| 10 | — | 3.0 | 1.27 |
| 10 | — | 3.5 | 2.06 |
| 10 | 33 | 1.25 | 0.10 |
| 10 | 33 | 1.50 | 0.35 |
| 10 | 33 | 1.75 | 1.38 |
| 10 | 33 | 2.0 | 1.80 |
| 20 | — | 0.5 | 0.07 |
| 20 | — | 0.8 | 0.28 |
| 20 | — | 1.0 | 0.86 |
| 20 | — | 1.2 | 4.88 |
| 20 | 33 | 0.2 | 0.04 |
| 20 | 33 | 0.3 | 0.08 |
| 20 | 33 | 0.5 | 0.34 |
| 20 | 33 | 0.8 | 1.81 |

V. Dissolution Rate Measurements

In order to quantify the rate of the dissolution reaction, and to determine the effect of the wetting agent thereon, the following kinetic expression is proposed:

$$\frac{d[S]}{dt} = \underline{k} \, A \, [S] \qquad (3)$$

$$\int_{[S]_o}^{[S]_t} \frac{d[S]}{[S]} = \underline{k} \, A_o \int_o^t dt \qquad (4)$$

$$[\ln S]\Big|_{[S]_0}^{[S]_t} = \underline{k}\, A_o\, t \qquad (5)$$

$$\log[S]_t = \frac{\underline{k}\, A_o}{2.303}\, t + \log[S]_o \qquad (6)$$

where [S] represents the amount of sulfur removed from a rod after time $t$, $A_o$ is the initial rod surface area, and $k$ is the dissolution rate constant.

Since heterogeneous dissolution reactions are predominantly diffusion or surface controlled, a first order dependence is assumed. This assumption is borne out by the linearity of the data points of the drawing, and the capability of the wetting agent to enhance reactivity.

The rate equation proposed above is not a rigorous expression of the reaction kinetics; it does not take into account the marked increase in actual, effective surface area of the sulfur rod during the coruse of the reaction, particularly in its advanced stages, due to chemical roughening, The change (increase) in area of the rod with time could not be followed experimentally, and it was therefore not possible to include a term in the rate equation to describe this effect. Thus, the validity of the proposed first order reaction implies that the weight of sulfur removed from the rod is a measure of the increase of surface area which occurs during the reaction. The actual weight of sulfur dissolved is plotted versus time the drawing to obtain the slope, and thence the rate constant from Equation (6).

Under actual field conditions, the effective sulfur removal rate would be anticipated to prove much greater than the laboratory values, due to the continuing increase in exposed sulfur surface area as a result of its roughening by the progressive chemical attack.

The derived rate constants (Table VIII) show a dramatic increase in dissolution rate of unexpected magnitude as a result of the presence of as little as 33 ppm (0.0033%) of a wetting agent: the reaction rates of 10 percent and 20 percent caustic soda with sulfur are enhanced by factors of 4.2 and 1.4, respectively, by its presence. This phenomenon is due to the difficulty of water-wetting sulfur, which is as hydrophobic as paraffin wax, even to aqueous alkalies.

Since no oil was present on the test sulfur rods, in a field application, wherein the deposited sulfur would undoubtedly be covered, at least to some extent, by oily hydrocarbons, the effects of the wetting agent would be expected to be far greater than those reported herein, due to removal of any oily hydrocarbon film by the supplementary detergent effect of the wetting agent.

XI. Contact Angle of Aqueous Solutions with Sulfur

Fresh, plane surfaces of monoclinic (beta) sulfur were prepared by casting molten sulfur onto clean microscope slides and cooling to room temperature. By means of an azimuthal micrometer microscope, measurements were immediately made of the supplements of the contact angles formed by small drops of the aqueous solutions, with and without wetting agent, resting on the sulfur surfaces. The measurements, which are tabulated in Table IX, clearly show that the wettability of the surface of the sulfur is greatly enhanced by incorporation of a wetting agent into the aqueous basic solutions.

TABLE IX

| System | Angle Measurements | Average Measurements* |
| --- | --- | --- |
| Distilled Water | 87, 88, 89, 87, 88° | 88° |
| 10% Aqueous Caustic Soda | 100, 101, 103, 102° | 102° |
| 10% Aqueous Caustic Soda and 33 ppm Wetting Agent | 157, 158, 158, 159° | 158° |

*The contact angles are the supplements of these average measurements.

Field Application

In a field application it is important that the reactive aqueous solution containing wetting agent contact the area where elemental sulfur deposition is most likely to occur, whether on the tubing of deep gas wells, or within the producing formation of shallower, cooler wells.

By way of an unrestrictive example wherein the reactive solution is aqueous caustic soda containing a wetting agent, to prevent or remove sulfur deposits from a sour-gas well downhole the solution might be introduced under pressure into the rising gas by means of a thin "spaghetti" tube inside the production tubing

TABLE VIII

FIRST-ORDER SULFUR DISSOLUTION RATE CONSTANTS ($k_r$ at 190°F.): AQUEOUS CAUSTIC SODA WITH AND WITHOUT WETTING AGENT

| Caustic Soda Concentration (% w/w) | Wetting Agent Concentration (ppm) | $k_r$ Slope (g/hr.) | (1/hr. ft.$^2$)* | $\dfrac{k_r \text{ (wetting agent)}}{k_r \text{ (no wetting agent)}}$ |
| --- | --- | --- | --- | --- |
| 10 | — | 0.51 | 33.3 | — |
| 10 | 33 | 2.12 | 139.4 | 4.2 |
| 20 | — | 2.15 | 141.5 | — |
| 20 | 33 | 2.97 | 195.0 | 1.4 |

*Area of rod is 0.035 ft.$^2$ string below the depth at which sulfur begins to separate from the gas. Reaction would thereupon occur converting the caustic soda to a solution of mixed sulfides of sodium which would then be entrained (in the form of slugs or mist) and lifted to the surface for subsequent separation or disposal.

Removal of sulfur deposited within the formation causing blockage of production may be carried out by squeezing the reactive aqueous wetting agent solution into the formation under pressure and subsequently back-flowing the well.

The dissolved sulfur can be chemically precipitated and recovered, as hereinbefore described, or the solution can be injected into a disposal well, if available. The released $H_2S$ can also be conducted to a Claus unit for conversion to valuable elemental sulfur.

The concentration of materials reactive with sulfur and surfactants or wetting agents suitable for use in my invention is dependent on the specific situation, and it is within the capabilities of one skilled in the art to determine the effective amount to be used. As a guide, however, it is preferred that the material reactive with sulfur have a concentration in water of from 3 to 50 percent (w/w) containing a surfactant concentration of from 10 to 100 parts per million (ppm).

I claim:

1. A process for preventing or removing solid sulfur deposits in an acid-gas or sour gas well, its attendant surface facilities or the production formation by contacting the sulfur deposits with an aqueous solution of about 3 to about 50 percent (w/w) of an inorganic material reactive with sulfur selected from the group consisting of alkalies, sodium sulfite and sodium bisulfite and about 10 ppm nonionic surfactant wetting agent.

2. A process as in claim 1 wherein the nonionic surfactant is an ethylene oxide adduct of nonyl phenol.

3. A process as in claim 1 wherein the inorganic material in solution is sodium hydroxide.

4. A process as in claim 1 wherein the inorganic material in solution is soda ash.

5. A process as in claim 1 wherein the inorganic material in solution is sodium sulfite or bisulfite sulfite.

6. A process for preventing or removing solid sulfur deposits in an acid-gas or sour gas well, its attendant surface facilities or the production formation by contacting the sulfur deposits with an aqueous solution of about 3 percent (w/w) to about 50 percent (w/w) sodium hydroxide and about 10 ppm to about 100 ppm of an ethylene oxide adduct of nonyl phenol.

* * * * *